United States Patent
Sun et al.

(10) Patent No.: US 8,086,178 B2
(45) Date of Patent: Dec. 27, 2011

(54) BEAM-FORMING METHOD FOR REALIZING INTERFERENCE SUPPRESSION

(75) Inventors: Changguo Sun, Shanghai (CN); Guiliang Yang, Shanghai (CN); Yingmin Wang, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 929 days.

(21) Appl. No.: 11/912,690

(22) PCT Filed: Apr. 20, 2006

(86) PCT No.: PCT/CN2006/000733
§ 371 (c)(1),
(2), (4) Date: Apr. 9, 2008

(87) PCT Pub. No.: WO2006/114045
PCT Pub. Date: Nov. 2, 2006

(65) Prior Publication Data
US 2009/0109093 A1    Apr. 30, 2009

(30) Foreign Application Priority Data
Apr. 28, 2005   (CN) .......................... 2005 1 0067904

(51) Int. Cl.
*H04B 1/00* (2006.01)
(52) U.S. Cl. ................ 455/63.1; 455/114.2; 455/278.1; 455/296; 375/148

(58) Field of Classification Search ........................ None
See application file for complete search history.

(56) References Cited

U.S. PATENT DOCUMENTS

| | | |
|---|---|---|
| 6,188,915 B1 | 2/2001 | Martin et al. |
| 6,480,139 B1 | 11/2002 | Hoctor |
| 2003/0104816 A1* | 6/2003 | Duplessis et al. ............. 455/448 |
| 2003/0216156 A1* | 11/2003 | Chun ......................... 455/562.1 |
| 2005/0201447 A1* | 9/2005 | Cairns et al. .................. 375/148 |

FOREIGN PATENT DOCUMENTS

CN    1449204    10/2003

* cited by examiner

*Primary Examiner* — Zhiyu Lu
(74) *Attorney, Agent, or Firm* — Merchant & Gould P.C.

(57) ABSTRACT

The present invention discloses a beam-forming method for realizing interference suppression, comprising steps of: a. performing channel estimation for an expected user signal and interference signal in signals received by an array antenna and obtaining array channel impulse responses of the expected user signal and the interference signal respectively; b. obtaining array correlation matrixes of the expected user signal and the interference signal respectively according to the array channel impulse responses obtained in step a; c. obtaining a new array correlation matrix of the interference signal according to relation between the expected user signal with the interference and noise; and d. computing a beam-forming weighting coefficient of the array antenna according to the array correlation matrix of the expected user signal obtained in step b and the new array correlation matrix of the interference signal obtained in step c. According to this method, strong interference signals can be suppressed and the direction of the formed beam will not deviate.

4 Claims, 2 Drawing Sheets

BEAM-FORMING METHOD FOR REALIZING INTERFERENCE SUPPRESSION

FIELD OF THE INVENTION

The present invention relates to beam-forming technologies, especially to a beam-forming method for realizing interference suppression, which guarantees direction of a formed beam not deviate.

BACKGROUND

Beam-forming refers to a process of computing an optimal weighting vector according to parameters and specifically refers to the process of realizing an optimal (sub-optimal) combination or an optimal (sub-optimal) allocation of signals after measuring and estimating parameters. The beam-forming technology uses an antenna array to aggregate signal power to a narrow beam so as to improve transmission efficiency of the antenna, reliability of the wireless link and repeat usage ratio of the frequency. Beam-forming algorithm can be designed based on different principles and generally there are two kinds of principles: maximum user power principle and maximum user CIR (Carrier to Interference ratio) principle. The beam-forming algorithm based on the maximum user power principle makes the receive power of the user maximum so that the receive SNR is improved. The beam-forming algorithm based on the maximum user CIR principle makes the receive CIR of the user maximum so that a null is formed in the direction of an interference signal and the directional interference is suppressed. Therefore, in order to suppress the interference signal, the beam-forming algorithm based on the maximum user CIR principle is often adopted.

In the conventional technology, the main idea of the beam-forming algorithm based on the maximum user CIR principle is that obtaining channel impulse responses of an expected user signal and interference signal respectively according to the channel estimation for the expected user signal and the interference signal in the received signals; obtaining array correlation matrix $\overline{R_S^{(k)}}$ of the expected user signal and the array correlation matrix $\overline{R_I^{(k)}}$ of the interference signal; and computing the beam-forming weighting coefficient of the array antenna according to the obtained array correlation matrixes.

Generally, the CIR received by user k can be expressed in formula (1).

$$\gamma^{(k)} = \frac{W^{(k)H} \overline{R_S^{(k)}} W^{(k)}}{W^{(k)H} \overline{R_I^{(k)}} W^{(k)}} \quad (1)$$

$w^{(k)}$ is the beam-forming weighting coefficient vector, $\overline{R_S^{(k)}} = h^{(k)} * h^{(k)T}$ is the array correlation matrix of the expected user signal, $h^{(k)}$ is the array channel impulse response vector of user $$k, \overline{R_I^{(k)}} = \sum_{\forall m \in I} h_I^{(m)*} h_I^{(m)T}$$

is the array correlation matrix of the interference signal and I is a set of interference signals.

For the beam-forming algorithm based on the maximum user CIR principle, since the optimization principle of such kind of beam-forming algorithm leads to maximum CIR and has no limits on the receive power of the user, it may cause that the main lobe of the formed beam may not direct to the direction of the expected user signal. The reason is that according to the formula (1), the interference suppression algorithm is realized by improving the power of the expected user signal and reducing the power of the interference signal. However, for an array antenna with N antenna units, the power of the expected user signal can be improved at most by N times; however, for the interference suppression, the degrees of freedom of the array antenna is N−1, so if the number of the interference signals is not larger than N−1, the interference signal can be set to zero theoretically. In addition, the expected user signal and the interference signal cannot be completely orthogonal. Thus, there is a confliction between making the expected user signal maximum and setting the interference signal to zero and the direction of the formed beam based on the maximum CIR will be deviated.

Therefore, because of the limit of the degrees of freedom and the orthogonality, the beam-forming algorithm based on the maximum CIR principle cannot guarantee the direction of the main lobe of the beam and the power of the expected user signal, which not only reduces the power but also increases the susceptibility to the error of the interference signal estimation.

SUMMARY OF THE INVENTION

A main objective of the present invention is to provide a beam-forming method for realizing interference suppression, which can suppresses strong interference signals and guarantee direction of a formed beam not deviate.

In order to achieve the above objective, the technical solution of the present invention is realized by providing a beam-forming method for realizing interference suppression which includes steps of:

a. performing channel estimation for an expected user signal and an interference signal in signals received by an array antenna and obtaining array channel impulse responses of the expected user signal and the interference signal respectively;

b. obtaining array correlation matrixes of the expected user signal and the interference signal respectively according to the array channel impulse responses obtained in step a;

c. obtaining a new array correlation matrix of the interference signal according to relation between the expected user signal with the interference and noise; and d. computing a beam-forming weighting coefficient of the array antenna according to the array correlation matrix of the expected user signal obtained in step b and the new array correlation matrix of the interference signal obtained in step c.

In the above solution, the step of obtaining the new array correlation matrix of the interference signal in step c specifically includes:

c1. setting a ratio coefficient according to a desired constraint ability on power of the expected user signal and power of the interference signal;

c2. computing a sum of diagonal elements in the array correlation matrix of the interference signal obtained in step b; and c3. adding the array correlation matrix of the interference signal obtained in step b to a product of the ratio coefficient, the sum of diagonal elements in the array correlation matrix of the interference signal and an unit array to obtain the new array correlation matrix of the interference signal.

The value of the ratio coefficient ranges between 0 and positive infinity.

The interference in the above solution includes interference in home cell, interference from outside cells and interference between base stations in a non-symmetry service mode in a TDD system.

According to the beam-forming method for realizing interference suppression provided by the present invention, the beam-forming method can suppress the interference and noise at the same time and control power of interference signal become smaller and the expected power become larger by computing the new array correlation matrix of the interference signal according to the relation between the interference and noise with the expected user signal and computing the beam-forming weighting coefficient of the array antenna according to the new array correlation matrix of the interference signal, so that strong interference can be suppressed while the power will not reduce and the direction of the formed beam will not deviate.

DETAILED DESCRIPTION OF THE INVENTION

In the beam-forming algorithm based on the maximum CIR (Carrier to Interference ratio) principle, since generally the ratio between the power of a received expected user signal and SINR (Signal-Interference & Noise Ratio) is required to be the maximum, i.e. the array correlation matrix in the denominator in formula (1) should be a sum of interference correlation matrixes and a noise correlation matrix, and the noise doesn't have a space correlation characteristic, the array correlation matrix of the noise is a unit matrix. In receiving the beam-forming, it is applicable that the correlation matrix in the denominator in formula (1) is the sum of interference correlation matrixes and the noise correlation matrix, but in the transmission process since noise sequences received by a user are fixed, there is no noise correlation matrix but only the interference correlation matrix in the transmission process.

For the beam-forming algorithm, only by suppressing the interference and the noise at the same time, i.e. making the power of received interference signal (signals) smallest and the power of expected user signal largest, the received SINR may be made largest. However, if there is no noise item, the beam-forming algorithm may only suppress the power of the interference signal, not constraint the power of the expected user signal, which will make the power of the expected user signal very small.

According to the above principle, the key of the present embodiment is to introduce a constant item and regards it as the received noise correlation matrix. This constant item has no physical meaning but only the function to guarantee the range of the numerator value in mathematics. When considering relation between the value of the unit matrix and the value of the noise correlation matrix, the smaller the constant item is, the stronger the ability of the beam-forming algorithm to suppress the interference is; and the larger the constant item is, the stronger the ability of the beam-forming algorithm to maximize the receiving power of the expected user signal is.

The main idea of the present embodiment is to take a sum of the computed array correlation matrix of the interference signal (signals) with the introduced constant item as new array correlation matrix of the interference signal (signals), and then compute beam-forming weight coefficient of the current array antenna according to the new array correlation matrix of the interference signal so as to guarantee the suppression of the beam-forming algorithm on the interference signal.

Figure 1:
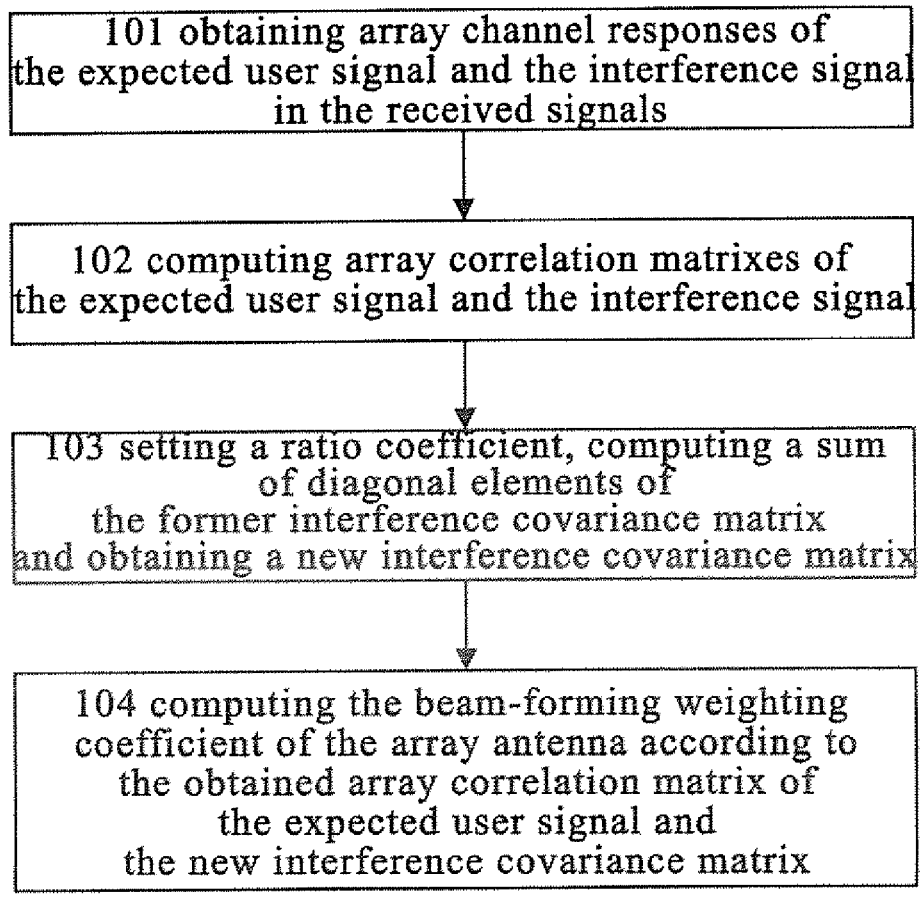
FIG. 1 is a flow chart of a method according to an embodiment of the present invention.

As shown in FIG. 1, the beam-forming method of an embodiment of the present invention includes the following steps.

In step 101, the channel estimation is performed on the expected user signal and the interference signal (signals) respectively in the signals received by all the antennas in the current array antenna, so as to obtain the array channel impulse response $h^{(k)}$ of the expected user signal and the array channel impulse response $h_I^{(m)}$, m=1, ..., M of the interference signal according to channel estimation method in the related art, wherein M is the number of the interference signals.

In the present embodiment, the interference includes interference in the home cell, interference from outside cells and interference between base stations in a non-symmetry service mode in a TDD (Time Division Duplex) system.

In step 102, the array correlation matrix $\overline{R_S^{(k)}}$ of the expected user signal and the array correlation matrix $\overline{R_I^{(k)}}$ of the interference signal are computed respectively based on the array channel impulse response obtained in step 101 and formula (2) and (3), wherein the array correlation matrix $\overline{R_I^{(k)}}$ of the interference signal is simply called interference correlation matrix $\overline{R_I^{(k)}}$.

$$\overline{R_S^{(k)}} = h^{(k)*} h^{(k)T} \qquad (2)$$

$$\overline{R_I^{(k)}} = \sum_{\forall m \in I} h_I^{(m)*} h_I^{(m)T} \qquad (3)$$

In step 103, a new interference correlation matrix $\overline{R_I^{(k)}}$ is obtained according to relation between the power of interference signal and power of expected user signal and relation between the unit matrix and the noise correlation matrix. At this time, the interference correlation matrix $\overline{R_I^{(k)}}$ is called the former interference correlation matrix $\overline{R_I^{(k)}}$. The obtaining process specifically includes the following steps.

Firstly, the trace of the former interference correlation matrix $\overline{R_I^{(k)}}$ is computed according to formula (4), i.e. the sum P of the diagonal elements in the former interference correlation matrix $\overline{R_I^{(k)}}$ is computed;

$$P = tr\overline{R_I^{(k)}} = \sum_n^N (\overline{R_I^{(k)}})_{n,n} \qquad (4)$$

n represents a sequence number of an antenna unit, N represents the number of the antenna units and the meaning of formula (4) is the sum of the diagonal elements of $\overline{R_I^{(k)}}$.

Then, a ratio coefficient λ between the interference correlation matrix and a constant unit array is set, the value of which represents the constraint ability on the power of expected user signal and the power of interference signal and ranges between 0 and positive infinity. If the value of λ is 0, it means that only interference signal is constrained and the expected user signal is not constrained. If the value of λ is positive infinity, it means that only the expected user signal is constrained and the interference signal is not constrained.

Then, the new interference correlation matrix $$\overline{R_I^{(k)}}'$$

is obtained according to the relation between the expected user signal and the interference and noise, which is shown in formula (5).

$$\overline{R_I^{(k)}}' = \overline{R_I^{(k)}} + \lambda P I^{(N)} \quad (5)$$

I is a constant unit array.

In step 104, a beam-forming weighting coefficient $w^{(k)}$ of the array antenna is computed according to the array correlation matrix $\overline{R_S^{(k)}}$ of the expected user signal and the new interference correlation matrix $$\overline{R_I^{(k)}}'$$

and based on the formula (6).

$$w^{(k)} = \arg\max \frac{w^H \overline{R_S^{(k)}} w}{w^H \overline{R_I^{(k)}} w} \quad (6)$$

Figure 2:
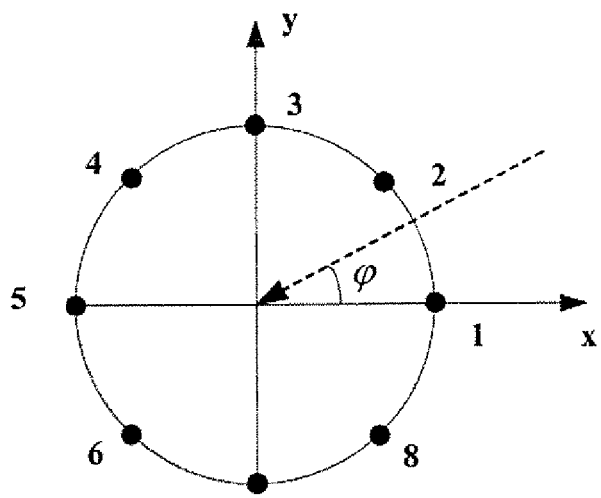
FIG. 2 is a schematic diagram showing architecture of an eight-unit uniform round array.

In the following description, a specific example will be adopted to illustrate the implementation process of the beam-forming method of an embodiment of the present invention. In the present embodiment, the adopted array antenna is an eight-unit uniform round array antenna, as shown in FIG. 2. The radius of the array antenna is 0.65λ and there are three interference signals. The direction-of-arrival φ of the expected user signal in the signals received by the array antenna is 50° and the direction-of-arrivals of the three interference signals are 30°, 150° and 250° respectively and they are single path channels.

In step a, a channel estimation is performed on the expected user signal and the interference signal respectively in the signals received by all the antennas in the array antenna, and the array channel impulse response $h^{(1)}$ of the expected user signal and the array channel impulse responses $h_I^{(1)}$, $h_I^{(2)}$, $h_I^{(3)}$ of the interference signals are obtained.

$$h^{(1)} = \begin{bmatrix} -0.7960 + 0.5002i \\ -0.5975 - 0.7670i \\ -1.0608 - 0.0454i \\ 0.9353 + 0.3255i \\ -0.9260 - 0.5069i \\ -0.6678 + 0.7391i \\ -1.0130 - 0.0790i \\ 0.9850 - 0.3019i \end{bmatrix}$$

-continued $$h_I^{(1)} = \begin{bmatrix} -0.8493 - 0.3787i \\ -0.6915 - 0.6868i \\ -0.5149 + 0.8326i \\ 0.4894 - 0.8939i \\ -0.9793 + 0.3720i \\ -0.7618 + 0.6590i \\ -0.4670 - 0.9570i \\ 0.5391 + 0.9175i \end{bmatrix}$$

$$h_I^{(2)} = \begin{bmatrix} -0.8493 + 0.3915i \\ 0.4942 - 0.8381i \\ -0.5149 + 0.8326i \\ -0.6964 - 0.7427i \\ -0.9793 - 0.3982i \\ 0.4240 + 0.8102i \\ -0.4670 - 0.9570i \\ -0.6467 + 0.7662i \end{bmatrix}$$

$$h_I^{(3)} = \begin{bmatrix} 0.2467 - 0.9785i \\ -0.8446 + 0.5639i \\ -0.8282 + 0.5829i \\ -0.1566 - 1.0110i \\ 0.1167 + 0.9718i \\ -0.9148 - 0.5917i \\ -0.7804 - 0.7073i \\ -0.1069 + 1.0345i \end{bmatrix}$$

In step b, the array correlation matrix $\overline{R_S^{(k)}}$ of the expected user signal and the interference correlation matrix $\overline{R_I^{(k)}}$ are computed respectively according to formula (2) and (3).

In step c, the ratio coefficient λ is set to 0.2 according to the constraint ability on the power of expected user signal and the power of interference signal, and the trace of the interference correlation matrix $\overline{R_I^{(k)}}$ is computed according to formula (4), i.e. the sum P of the diagonal elements is computed.

$$P = tr\overline{R_I^{(k)}} = \sum_n^N (\overline{R_I^{(k)}})_{n,n} = 24.4309$$

And then, the new interference correlation matrix $$\overline{R_I^{(k)}}'$$

is obtained according to formula (5).

$$\overline{R_I^{(k)}}' = \overline{R_I^{(k)}} + \lambda P I^{(N)} = \overline{R_I^{(k)}} + 0.2 * 24.4309 I^{(N)} = \overline{R_I^{(k)}} + 4.8862 I^{(N)}$$

In step d, the beam-forming weighting coefficient of the eight-unit array antenna is computed according to the $\overline{R_S^{(k)}}$ obtained in step b and the $$\overline{R_I^{(k)}}'$$

obtained in step c based on the formula (6). In the present embodiment, un-amended beam-forming coefficient $w_0$ and amended beam-forming coefficient w are shown as below respectively.

$$w_0 = \begin{bmatrix} -0.1906 + 0.6533i \\ -0.1058 + 0.1922i \\ -0.1837 + 0.2538i \\ 0.0211 + 0.1399i \\ 0.2177 - 0.0710i \\ -0.2306 - 0.2814i \\ 0.3196 - 0.2764i \\ 0.0631 + 0.0573i \end{bmatrix} \quad w = \begin{bmatrix} -0.2833 + 0.1018i \\ -0.1389 - 0.2474i \\ -0.3366 - 0.2494i \\ 0.1770 + 0.3279i \\ -0.0886 - 0.2738i \\ -0.2647 + 0.0693i \\ -0.4379 - 0.1094i \\ 0.3820 - 0.0848i \end{bmatrix}$$

The term "amended" here refers to add (introduce) the weighting of the constant item and the term "un-amended" refers to not add the weighting of the constant item.

Figure 3:
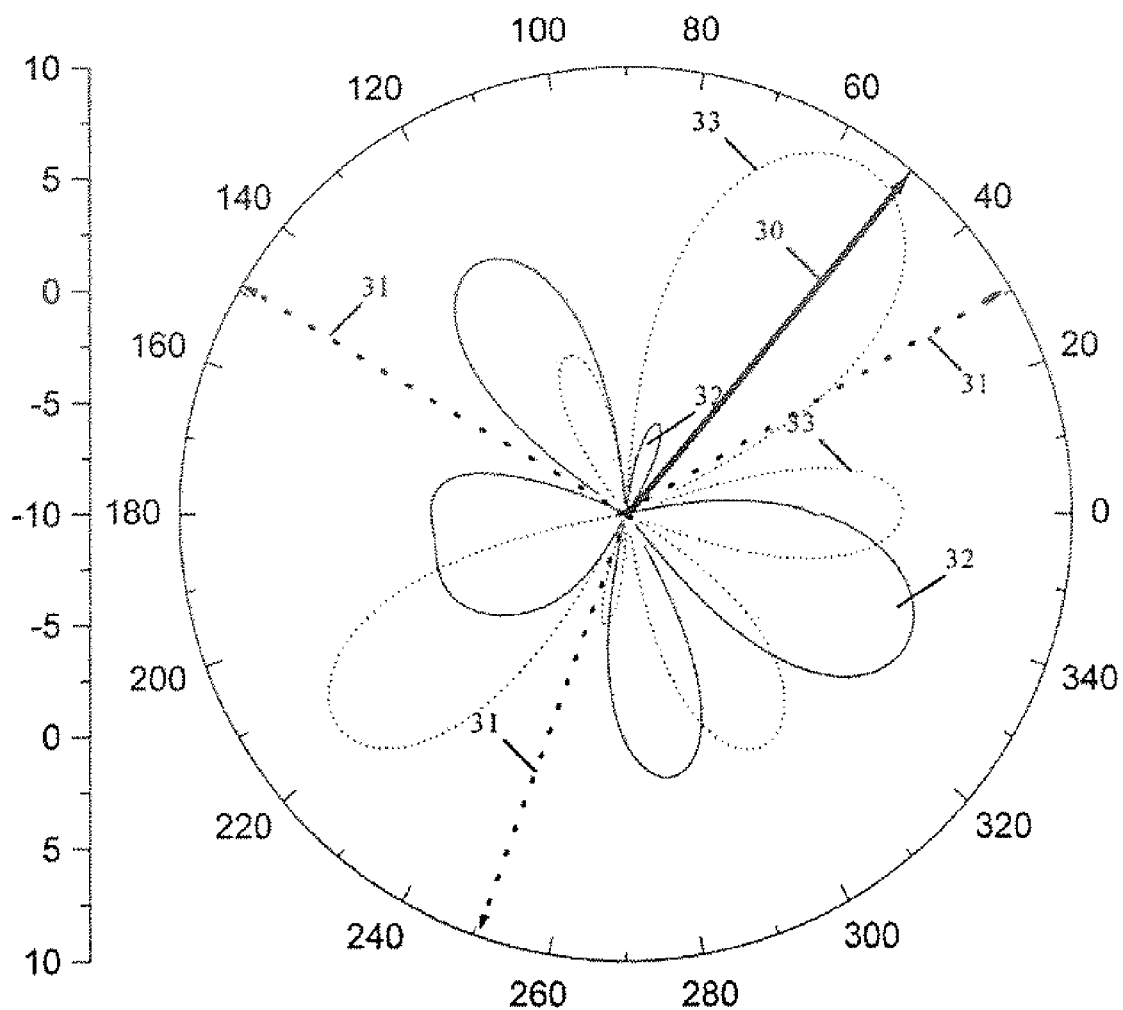
FIG. 3 is a diagram showing comparison between the method of an embodiment of the present invention and the conventional technology.

FIG. 3 is a diagram showing effect comparison between the beam formed by the method of the present invention and the beam formed by the method of an embodiment of the conventional technology. In FIG. 3, arrowed solid line 30 represents the direction of the expected user signal, three arrowed broken lines 31 represent the directions of the three interference signals, the solid beam 32 represents the beam formed by the method of the conventional technology and the broken line 33 represents the beam formed by the method of an embodiment of the present invention. FIG. 3 shows that the beam formed by the method of the conventional technology in the expected user signal direction is smaller than that in the interference signal direction and the beam formed by the method of an embodiment of the present invention in the expected user signal direction is obviously larger than that in the interference signal direction, which may suppress interference and guarantee the directivity of the formed beam.

The beam-forming method of the present invention may be used to receive and transmit beam-forming. In the receiving process using the beam-forming method, the interference refers to that on the expected user signal by the signal of the interference signal in the received signals; in the transmission process using the beam-forming method, the interference refers to that on the transmission signal of the interference user by the transmission signal of the expected user.

The above are only preferred embodiments of the present invention, which are not intended to limit the protection scope of the present invention.

The invention claimed is:

1. A beam-forming method for realizing interference suppression, comprising steps of:
   a. performing channel estimation for an expected user signal and an interference signal in signals received by an array antenna and obtaining array channel impulse responses of the expected user signal and the interference signal respectively;
   b. obtaining array correlation matrixes of the expected user signal and the interference signal respectively according to the array channel impulse responses obtained in step a;
   c. setting a ratio coefficient between the interference correlation matrix and a constant unit array according to a desired constraint ability on power of the expected user signal and power of the interference signal;
   d. computing a sum of diagonal elements in the array correlation matrix of the interference signal obtained in step b;
   e. adding the array correlation matrix of the interference signal obtained in step b to a product of the ratio coefficient, the sum of diagonal elements in the array correlation matrix of the interference signal and an unit array to obtain the new array correlation matrix of the interference signal; and
   f. computing a beam-forming weighting coefficient of the array antenna according to the array correlation matrix of the expected user signal obtained in step b and the new array correlation matrix of the interference signal obtained in step e.

2. The method according to claim 1, wherein a value of the ratio coefficient ranges between 0 and positive infinity.

3. The method according to claim 1, wherein the interference is interference in the present cell, interference from outside cells and interference between base stations in a non-symmetry service mode in a TDD system.

4. The method according to claim 1, wherein the method is applicable in a formed beam transmission procedure or a formed beam receiving procedure.

* * * * *